Patented Aug. 3, 1937

2,088,640

UNITED STATES PATENT OFFICE 2,088,640

INSECTICIDE

William McIlvaine Dickson, Woodside, Del., and Arthur H. Henninger, Floral Park, N. Y., assignors to General Chemical Company, New York, N. Y., a corporation of New York No Drawing. Application December 29, 1932, Serial No. 649,321. Renewed August 5, 1936

5 Claims. (Cl. 167—15)

The present invention relates to insecticides, and in the more specific aspects is directed to improvements in insecticides adaptable for use as insecticidal sprays or dusts for the treatment of plants generally, fruits in particular, and soils.

Various insecticides, for example arsenicals such as Paris green, calcium arsenate, lead arsenate, zinc arsenite and ferric arsenate have been employed or their use suggested, either in powder form or in water suspension, for controlling insect pests. Although such substances have been more or less widely used, it is general knowledge in the art, that the efficiency of known insecticides is low, and in seasons in which codling moth infestation is unusually heavy, the percentage of apples injured by the codling moth may exceed 50%.

As one of the principal objects, the invention aims to provide insecticides of notably greater effectiveness than that of insecticidal compositions heretofore available. Irrespective of any theory involved, or reason for such increased effectiveness advanced herein, the invention is directed to the provision of insecticides comprising chiefly toxic insecticidal substances, for example various arsenicals, with which are incorporated ingredients which in themselves have little or no now apparent insecticidal value but, among other characteristics, possess marked bitter and astringent properties.

More particularly, the insecticides of the invention preferably comprise a major portion of toxic insecticidal material, for example, one or more arsenicals, together with a smaller portion of aloes or quassia or extracts thereof. In preferred embodiments, the invention contemplates insecticidal compositions comprising lead arsenate having incorporated therewith substances such as quassia and aloes. Particularly preferred compositions comprise lead arsenate together with quassia or aloes.

Several different insecticidal substances, for example arsenicals such as the arsenates or arsenites of lead, zinc, calcium, copper, iron, magnesium, chromium and aluminum are suitable for use as the principal toxic ingredient of the products of the invention. The observations and research upon which the invention is based indicate that substances such as quassia and aloes having pronounced astringent properties are remarkably well adapted for incorporation with the toxic element of the insecticide to improve the efficaciousness thereof. Thus, the insecticides constituting the invention may preferably comprise an arsenical, such as lead arsenate, mixed with an astringent substance such as ground quassia chips or ground aloes or the dried extracts of quassia and aloes. If desired, however, one or more arsenicals may be admixed with one or more of the astringent ingredients.

Notably improved results may be obtained by the use of a composition containing as little as 60% arsenical, the balance comprising one or more of the astringent materials, either pure or including diluents. More particularly, however, the invention contemplates an insecticide comprising principally an arsenical, and less than about 25% astringent material. It has been found that the effectiveness of arsenical insecticides is greatly increased where the astringent material content varies from about 1% to about 10%, with especially good results being obtained when the insecticide consists of about 90% arsenical and about 10% astringent substance.

In tests carried out in the field for the purpose of comparing the efficiency of the preferred compositions with other well-known insecticides, procurable in the market and containing lead arsenate as the major toxic ingredient, it was found that in the case of one variety of apples, treated with a commercial lead arsenate insecticide, the percentage of stung and wormy apples, i. e., unmarketable fruit, was close to 50%. Under substantially identical conditions, where one of the above-described preferred insecticide compositions consisting of approximately 10% ground quassia chips and 90% lead arsenate was employed, the percentage of stung and wormy apples was reduced to less than 8%. Where another of the above-noted insecticides including ground aloes was utilized, the ingredients being in the proportions of 10% aloes and 90% lead arsenate, the percentage of stung and wormy apples was reduced to about 6%. In further field work in connection with another variety of apples, where a standard lead arsenate insecticide was employed, the percentage of stung and wormy apples was about 25%. Where another of the improved insecticides of the invention, comprising about 99% lead arsenate and about 1% ground aloes was utilized under substantially identical conditions, the percentage of stung and wormy apples was reduced to about 12%.

It will be seen from the above, that the incorporation of the materials noted with the arsenical results in compositions much more effective than known insecticides.

Study of the feeding habits of the larvae of certain chewing insects, such as the codling moth, seems to present reasonable ground for the assumption that one possible reason for the ineffectiveness of prior insecticides, particularly arsenicals, may not be on account of a lack of toxicity of the insecticide, but because of the peculiar physical ability of the larvae to quickly eliminate the poison dose from the body through the short alimentary tract before the toxic properties of the insecticide have had time to act and prove fatal. Based on present observations, it is believed there is reasonable basis for the presumption that the greatly improved results obtained by use of insecticides of the invention may be attributed to the astringent and bitter ingredients of the mixtures which act to paralyze the segment muscles of the larvae, thus preventing elimination of the toxic arsenical ingredient before it becomes effective, and counteracting the results of the known habit of the larvae of ejecting the first bite on the outer surface of the fruit (which carries the poison) before burrowing into the underlying tissue.

Irrespective of theory, however, the fact remains that by the addition of the astringent and bitter ingredients to the arsenical, such as lead arsenate, insecticide products have been produced which have proved in the field to be more effective for pest control than prior commercial insecticidal compositions.

In making up the compositions constituting the invention, it is preferred to mix the ingredients in dry form, although it may be found desirable to incorporate the astringent substances at some step in the process of making the insecticide before the latter is obtained in dry form.

When the above compositions are to be employed as a spray, satisfactory suspensions may be made up by mixing about one to one and one-half pounds of insecticide with about 50 gallons of water. Application to the fruit under treatment is effected in the usual manner. Similarly when applying the composition by dusting, the usual procedure may be followed.

The improved insecticides may be applied in the field as sprays or dusts, either alone, or in combination with fungicides such as sulfur, Bordeaux mixture, or other copper fungicide such as colloidal copper, or with other insecticides such as nicotine, oil sprays, and in general, with stomach poisons and contact insecticides. If desired, relatively small amounts of deflocculating agents, such as dextrine, may be incorporated in the improved products.

We claim:
1. An insecticide comprising lead arsenate and approximately 1–10% quassia.
2. An insecticide comprising lead arsenate and approximately 1–10% aloes.
3. An insecticide comprising about 90% lead arsenate and about 10% quassia.
4. An insecticide comprising about 90% lead arsenate and about 10% aloes.
5. An insecticide comprising a dry, unreacted mixture containing a predominating quantity of lead arsenate and approximately 1–10% of a substance of the group comprising quassia and aloes.

WILLIAM M. DICKSON.
ARTHUR H. HENNINGER.